H. L. PITMAN.
COMBINED TYPEWRITING AND COMPUTING MACHINE.
APPLICATION FILED OCT. 25, 1917.

1,350,387.

Patented Aug. 24, 1920.
4 SHEETS—SHEET 1.

FIG. 1.

WITNESSES:
Andrew R. Johnson
Julius Duchstine

INVENTOR:
Henry L. Pitman
BY B. B. Stickney
ATTORNEY.

H. L. PITMAN.
COMBINED TYPEWRITING AND COMPUTING MACHINE.
APPLICATION FILED OCT. 25, 1917.

1,350,387.

Patented Aug. 24, 1920.
4 SHEETS—SHEET 2.

FIG. 2.

WITNESSES:
Arthur A. Johnson
Julius Duckstine

INVENTOR:
Henry L. Pitman
BY
B. B. Stickney
ATTORNEY.

UNITED STATES PATENT OFFICE.

HENRY L. PITMAN, OF EAST ORANGE, NEW JERSEY, ASSIGNOR TO UNDERWOOD COMPUTING MACHINE COMPANY, OF NEW YORK, N. Y., A CORPORATION OF NEW YORK.

COMBINED TYPEWRITING AND COMPUTING MACHINE.

1,350,387.  Specification of Letters Patent.  Patented Aug. 24, 1920.

Application filed October 25, 1917. Serial No. 198,375.

*To all whom it may concern:*

Be it known that I, HENRY L. PITMAN, a citizen of the United States, residing in East Orange, in the county of Essex and State of New Jersey, have invented certain new and useful Improvements in Combined Typewriting and Computing Machines, of which the following is a specification.

This invention relates to combined typewriting and computing machines, and is illustrated in connection with improvements disclosed in my application No. 186,098, filed August 14, 1917.

In the prior application, a plurality of totalizers were shown for computing in vertical columns, and a cross-totalizer for computing in horizontal columns. The series of vertically-computing totalizers were connected to travel continuously with the typewriter carriage, while the cross-totalizer was intermittently connected to vibrate repeatedly during a single run of the typewriter carriage. In case it was necessary to return the typewriter carriage after having advanced beyond a computing zone, for the purpose of correcting an error, it was previously necessary to return the carriage beyond the computing zone and then readvance the same, so that the pick-up connection between the cross-totalizer and the typewriter carriage could come into play properly. If this were not done, erroneous typewriting without computing would take place.

In the present case provision is made whereby the typewriter carriage need only be returned or back-spaced to the particular digit column where it is desired to correct an error, and other means is provided for repositioning the cross-totalizer. This may be done by reconnecting it with the typewriter carriage at the proper point, so that the computing wheel corresponding to the particular digit column at the printing point will be in register with the master wheel. This includes a connection from the back-space key, whereby the back-space key, when operated, will give the cross-totalizer an idle advance movement its full throw, and then permit it to return, so that the hook, which causes the traveling of the cross-totalizer with the typewriter carriage, will become reconnected to a dog on the typewriter carriage, corresponding to the computing zone or column in action.

This mechanism requires the operation of the back spacer whenever the typewriter carriage is returned to a computing zone, without returning it beyond the computing zone or for the full length of its return movement. In order to prevent error, locking means is provided for preventing the operation of the numeral keys when the typewriter carriage has been partially returned into a computing zone without an operation of the back-space key. The lock for preventing the traveling movement of the cross-totalizer when a computing operation takes place is made use of for this purpose. This consists of a blocking lug on the traveling totalizer, which is engaged by a toothed lever at the operation of any of the numeral keys. After finishing a zonal run with the typewriter carriage, the cross-totalizer is arranged to return to a point just beyond the registering of the master wheel with the computing wheel of highest denomination. When the typewriter carriage is returned to a computing zone, the pick-up dog on the carriage corresponding to that zone is arranged to advance the hook, which is normally connected to the dog in a computing operation, a short distance so that, through the connecting train of gearing, the cross-totalizer will be advanced far enough to bring the blocking lug thereon into the path of the tooth on the locking lever, to prevent its operation. The locking lever acts back on the numeral keys, so as to prevent an operation of the numeral keys. Thus, the back-space key must be operated to give the cross-totalizer a forward and backward movement, to bring about a connection of the pick-up hook with the pick-up dog corresponding to the computing zone at the printing point. This will bring the blocking lug on the totalizer out of register with the locking lever, permitting an operation of the numeral keys.

As this latter locking mechanism is operated by the pick-up dog for the cross-totalizer, it lies in the path of travel of the pick-up dogs and also in the path of their movement when being set. Provision is therefore made for temporarily removing the locking mechanism from the range of the pick-up dogs when the latter are being set by the key-set tabulating mechanism.

Other features and advantages will hereinafter appear.

In the accompanying drawings.

Alphabet keys 1 and numeral keys 2 operate key-levers 3 to rock bell-cranks 4, so as to swing type-bars 5 up rearwardly against the front side of a platen 6 mounted to rotate in a carriage 7. The carriage 7 has the usual step-by-step movement under the control of an escapement mechanism indicated in general at 8. This escapement mechanism is that found on the Underwood standard typewriter, and includes a rack bar 9 pivoted to the carriage 7, so as to engage a pinion 10 connected by a one-way pawl-and-ratchet mechanism (not shown) to an escapement wheel 11. The wheel 11 is controlled in its movement by fixed and loose dogs 12 and 13 operated by a floating frame 14, which carries a universal bar 15, engaged by heels 16 on the type-bars 5. This enables the carriage 7 to be advanced step by step in a letter-feeding direction at the operation of the alphabet keys 1 and the numeral keys 2.

In addition to having a letter-feeding movement, the carriage 7 has major jump or column-selecting movements for the purpose of moving the carriage quickly from zone to zone. This includes tabulating keys 17, (Fig. 1), which operate plungers 18 to project the latter into the path of stops 19 on a rack 20 carried by the typewriter carriage 7.

The stops 19 are arranged to be key-set, so that the carriage can be positioned to any particular letter-space and the stop corresponding to that space for a zone or major column automatically selected and set. This includes a series of the stops 19, one for each letter-space on the typewriter carriage 7, and they are adjustably held in their set and unset positions on the rack bar 20. To set these stops, there is provided a key 21, Fig. 2, which, when operated against the tension of a spring 22, thrusts downwardly on a link 23, so as to rock an arm 24 secured to a rock shaft 25, which, in turn, rocks on arm 26 to draw down on a link 27. The link 27 is provided with a slot 29 through which extends a rod 28 to guide it for substantially vertical movements. This link 27 is provided with an offset 30, which overhangs the row of column-determining stops 19, and when the key 21 is operated, depresses the particular stop 19 which happens to lie under it. This stop corresponds to the letter-space position of the carriage, and will subsequently bring the carriage to a halt at a corresponding position when one of the tabulating keys 17 is operated. This mechanism is used, as will be seen subsequently, in setting the pick-up dogs forming part of the connections between the typewriter carriage 7 and a vibrating cross-totalizer which will presently be described.

The totalizers which enable a concomitant computing action with a typewriting action, so that the numbers as typewritten will be recorded, include a series of footing totalizers or vertically computing totalizers 31, which are detachably and adjustably mounted on a supporting bar 32, which is connected to travel with the typewriter carriege 7 by means of one or more brackets 33. The vertically-adding totalizers 31 thus travel step by step with the carriage 7, so that they can come into play when the typewriter carriage 7 is at computing zones or major columns corresponding to their positions.

A cross-totalizer 34 is provided for adding horizontally the lines of numbers which are computed individually into the vertical or column totalizers 31. This cross-totalizer 34, as explained in the above-mentioned application, has a step-by-step advancing movement with the totalizers 31 and the typewriter carriage 7 for the range of a column or zone, and then returns quickly to a starting position, so that it can advance in register with the next vertical column totalizer 31 in the next desired computing zone of the typewriter carriage.

Before going into details of this mechanism, the connection whereby the totalizers 31 and 34 are driven from the numeral keys will be briefly explained. Each of the numeral keys 2 from "1" to "9" is provided with a valuating or indexing plate 35, which has a cam 36 of certain curvature corresponding to the value of its key. That is to say, the cams 36 are graded in their pitch or throw from a minimum for the "1" key to a maximum for the "9" key, whereby they operate a bail 37 graded amounts corresponding to the value of their associated keys. The bail 37 is detachably connected to an actuator 38, in a manner more fully described in the above-mentioned application. This actuator 38, when a numeral key is operated, draws down on a link 39, so as to rock a bell-crank 40, which thrusts forward on a link 41, so as to advance a driving rack 42. The driving rack 42 rotates, in a manner described in the above-mentioned application, a train of gearing 43, so as to rotate a master wheel 44 an amount corresponding to the value of the particular numeral key actuated. The master wheel 44 is positioned so as to drive a computing train of wheels 45 of whichever one of the vertical column totalizers 31 happens to be in active range thereof, depending on the particular position of the carriage 7. The train of gearing 43 includes a shaft 46, Fig. 1, which is arranged to drive a master wheel 47 for the cross-totalizer 34. This includes a beveled gear 48, Figs. 1 and 2, secured to the shaft 46, meshing with a beveled gear 49 on a vertical shaft 50, which drives a shaft 51 through the intermediary of a pair of gears 52 and 53. The shaft 51 drives a train of gearing (not shown) connected to rotate the master wheel 47. This mechanism is more fully described in my above-mentioned application.

When any of the numeral keys 2 is actuated, it operates a locking mechanism to lock the traveling totalizers. This includes a cam lug 54 on each of the numeral keys 2 forming part of the plates 35 in the case of the numeral keys from "1" to "9." The lugs 54 are arranged to engage a bail 55. This may be part of the usual line lock mechanism. The bail 55 has an extension 57 provided with a pin 58 arranged to rock an arm 59 secured to a shaft 60. The shaft 60 is provided with a locking arm 61 arranged to engage between the beveled teeth of a rack 62, provided on the bar 32, which travels with the typewriter carriage 7. This locks the totalizers 31 against a traveling movement when a number is being run up into one of the totalizers by the master wheel.

To prevent a traveling movement of the cross-totalizer 34, the shaft 60 is provided with an arm 63 connected by a link 64 to one arm on a rock shaft 65 having also an arm 66 mounted thereon. This rocks the shaft 65 upwardly, so as to move the arm 66 to bring the outer end 67 thereof in between two of the beveled teeth of a rack 68, provided on a vibratory carriage 69, to which the cross-totalizer 34 is detachably secured.

It should be understood that the forward ends of the arms 61 and 66 are pointed or V-shaped, to engage between the teeth 62 and 68, respectively. With this construction each arm also serves as an alining device to properly position the totalizers, so that the computing wheels contained therein will be accurately alined with their respective master wheels. This locking or alining mechanism associated with the cross-totalizer is also used as a means to prevent an improper operation of the numeral keys, as when the typewriter carriage 7 is in a computing zone without the totalizer 34 being properly connected to travel therewith. Under such circumstances, it provides means to prevent an operation of the numeral keys in a manner which is explained more fully hereinafter.

For the purpose of effecting an intermittent traveling movement of the cross-totalizer 34 in synchronism with the carriage 7, and with each of the vertical column totalizers 31, provision is made for intermittently connecting the cross-totalizer 34 to the typewriter carriage 7. For this purpose there is provided on the typewriter carriage 7 to the rear thereof a pick-up rack 70, which is provided with a series of pick-up dogs 71, one for each letter space of the typewriter carriage 7. The pick-up dogs 71 are mounted for sliding movement back and forth of the rack 70, so that they can be set individually to determine at what points in the travel of the carriage 7 the cross-totalizer 34 will be picked up for a synchronized traveling movement with the carriage 7 and with the vertical column totalizer 31. This is generally to correspond with the computing zone or columns as determined by the tabulating carriage stops 19.

Figures 6, 7, 8, 9:
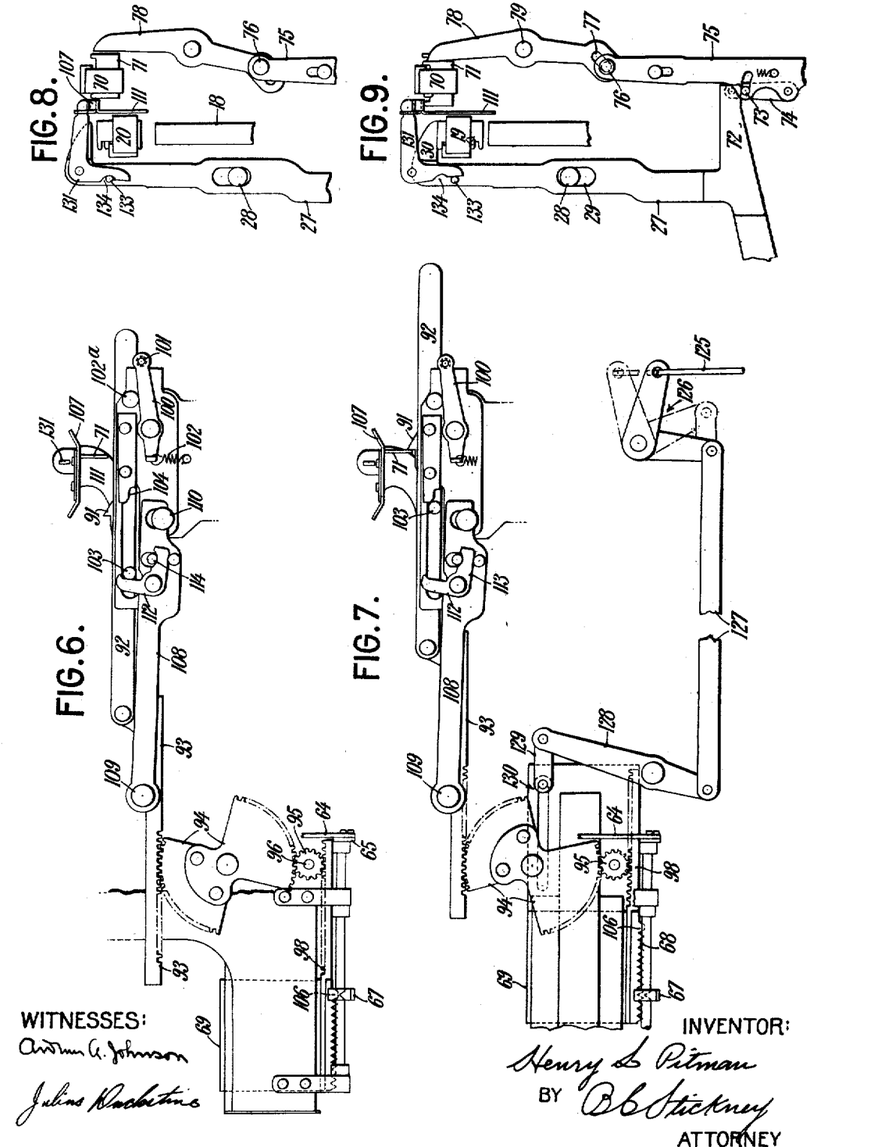
Fig. 6 is a detail view, similar to Figs. 4 and 5, after the carriage has been moved back into a computing zone without the assistance of the back-space key, and without passing through that zone, and showing how the pick-up dog locks the numeral keys by advancing the totalizer carriage slightly beyond starting position.
Fig. 7 is a view, similar to Fig. 6, showing the mechanism for giving the cross-totalizer a full-stroke advancing movement when the back-space key is operated to move back the typewriter carriage and bring about a re-registering of the cross-totalizer with the typewriter carriage.
Fig. 8 is a detail view of the key-set tabulating mechanism for setting the totalizer pick-up dogs, with the means for clearing the numeral-key-lock which may be operated by the stop-setting means slightly in advance of setting the pick-up dogs. This view shows the clearing mechanism in its inactive position prior to the setting of a pick-up dog.
Fig. 9 is a view, similar to Fig. 8, after the key-set tabulating mechanism and the pick-up dog-setting mechanism has been operated, which action clears the lock controlling cam operated by the pick-up dogs, so as to permit the setting of a dog.

The same mechanism for setting the tabulating stops 19 is used to set the pick-up dogs 71. For this purpose, the setting key 21 when operated, in addition to depressing one of the tabulating stops 19, also sets forwardly a corresponding one of the pick-up dogs 71. For this purpose, the link 27 is provided with an arm 72, Fig. 2, which at times overlies a pin 73 provided on a swinging arm 74, pivotally mounted on a vertical sliding link 75. When the pin 73 is within the range of the arm 72, a depression of the tabulating setting key 21 draws down on the link 75 so that a pin 76 on the upper end of this link will travel downwardly in a cam slot 77, Fig. 9, provided on a setting lever 78. This will rock the lever 78 about its pivot 79, so that the upper end thereof moves forwardly to set the particular pick-up dog 71 which happens to be in register therewith. This pick-up dog will correspond to the tabulating stops 19 set at the same time, so that when a computing zone or major column of the carriage 7 is determined upon, if it is desired to compute in the cross-totalizer 34 for this zone or column, the corresponding pick-up dog 71 will be set at such time.

The position of the pin 73 as to the arm 72 will determine whether one of the pick-up dogs 71 shall be set. The position of the pin 73 is controlled from a lever 80 at the front of the typewriting machine, which has a lost-motion connection with a lever 81 by means of a pin 82, which extends between space arms 83 and 84 on the lever 81. To silence the dog setting finger 78 the hand lever 80 is moved forwardly to rock the lever 81, so as to pull on a link 85 which swings an arm 86 secured to a rock shaft 87. The rock shaft 87 is provided with a second arm 88 arranged to rock a bell-crank 89 having a pin-and-slot connection 90 with the swinging arm 74. This will move the pin 73 away from beneath the operating arm 72. Thus the pick-up dog setting lever 78 is silenced so that it is not operated when the tabulating stop-setting key 21 is actuated. When the controlling hand lever 80 is operated rearwardly from its forward position, the pin 73 will be brought beneath the operating arm 72, so as to read the pick-up dog setting mechanism effective.

The pick-up dogs 71 when set are arranged to engage one by one with a hook 91, provided on a rod 92, pivotally connected to a rack bar 93. When the hook 91 is engaged by the pick-up dogs 71 and the typewriter carriage 7 is traveling in an advancing direction, the rack 93 is driven to the right, as seen in Figs. 6 and 7, so as to rock a double segment gear 94, which is arranged to drive a pinion 95. The pinion 95 is secured to the rear end of a shaft 96, Figs. 1 and 2, which is provided at its forward end with a pinion 97, meshing with a rack 98 on the vibratory carriage 69. This vibratory carriage carries the cross-totalizer 34, so that when a pick-up dog 71 corresponding to a typewriter zone or major column is in engagement with the hook 91, the cross-totalizer 34 will have a step-by-step movement in synchronism with the typewriter carriage 7, and also in synchronism with the vertical column totalizer 31, if there happens to be one set on the bar 32 at a point corresponding to this particular computing zone or major column. This will advance the cross-totalizer 34 step by step to bring the computing wheel train thereof into individual register with the master wheel 47, so that the digits as typewritten for a particular computing zone selected will be run up into the cross-totalizer 34.

Figures 3, 4, 5:
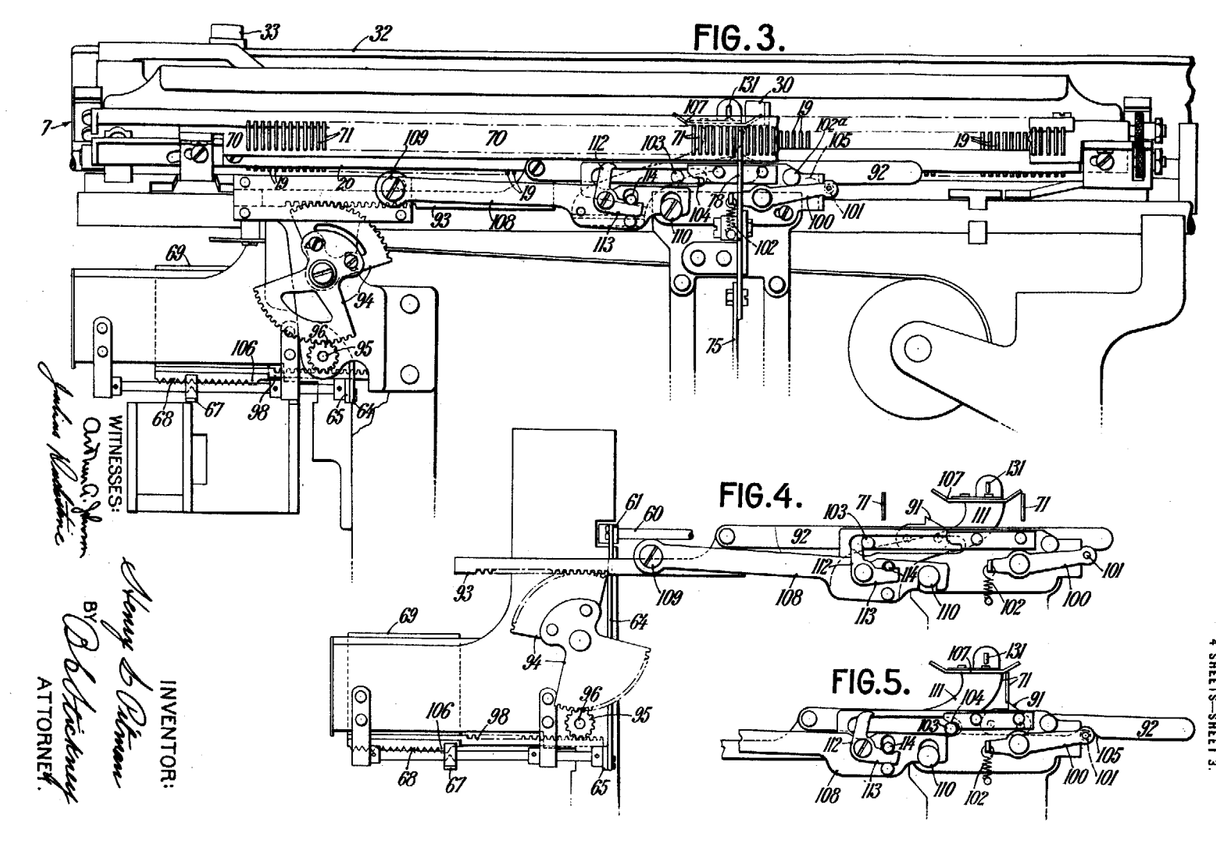
Fig. 3 is a rear view in elevation, showing the means for locking the numeral keys when the typewriter carriage has been brought back into a computing zone. This locking means is shown in its inactive position as the carriage is properly connected to the cross-totalizer and moving in a normal letter-feeding direction.
Fig. 4 is a detail view, similar to Fig. 3, showing the cross-totalizer as restored to starting position after the release of the pick-up connection, and ready to be caught by the next pick-up dog for the next computing zone when the carriage is advanced far enough for the latter to reach the same.
Fig. 5 is a detail view, showing a part of the mechanism illustrated in Fig. 4, in which a pick-up dog is in the act of being released from the pick-up hook, and before the cross-totalizer has returned to its starting position.

The advancing movement of the cross-totalizer 34 is done against the tension of a spring 99 wound on the shaft 96. This spring 99 returns the cross-totalizer 34 at the end of each computing zone or column that it travels, in unison with the carriage 7, after the hook 91 is disconnected from the pick-up dog 71 in engagement therewith. The hook 91 is normally held in a raised position to engage the pick-up dogs 71 by means of a lever 100, which has a pin 101 underlying the rod 92. The lever 100 is held by a spring 102 against a stop 102ᵃ. When the cross-totalizer 34 reaches the end of its advancing movement and the digit is run up in the units computing train, a pin 103 on the rod 92 comes into engagement with a fixed disconnector 104 in the form of a cam, so that the pin 103 and the rod 92 are depressed against the tension of the spring 102, Fig. 5. A notch 105, Fig. 5, is provided on the rod 92 corresponding to the end of the travel of the cross-totalizer 34. This permits the hook 91 to move downwardly, without tensioning the spring 102, and clear a particular pick-up dog 71 in carrying engagement therewith, so that the spring 99 can act to return the hook 91, the rod 92, the connecting train of gearing and the cross-totalizer 34 to their initial or starting positions. This action can be repeated for each computing zone or column according to the number of pick-up dogs 71 which are in their forward active position.

If the cross-totalizer 34 is disconnected by the advancement of the carriage 7 beyond a computing zone and the carriage 7 is brought back into this computing zone, without completely returning or without passing clear through the computing zone and re-advancing, then the cross-totalizer 34 will not be connected for traveling movement with the typewriter carriage 7. Under such circumstances, digits typewritten, as, for example, for the purpose of correcting an error, would not be run into the cross-totalizer 34. Where it is desired to run these digits into the cross-totalizer 34, provision is made for automatically insuring the reconnection of the cross-totalizer 34 with the carriage 7. This is done indirectly by providing means for locking the numeral keys when the carriage is returned into a computing zone without causing the cross-totalizer to be reconnected therewith. A simple key-operated mechanism is provided, however, for concomitantly back-spacing the carriage into a computing zone and reconnecting the cross-totalizer in proper relation, without rendering said numeral-key-locking means effective. This locking means and associated mechanism will now be described.

The cross-totalizer carriage 69, as will be seen by reference to Figs. 3, 4, 6 and 7, is provided with a blocking lug 106, forming a continuation of the locking rack 68, which, when the cross-totalizer 34 has returned to its starting position, will come to a position just in the rear of the locking arm 67. Unless the carriage 7 is brought back into a computing zone while the cross-totalizer 34 remains at its initial or starting position, the numeral keys will be free to operate. When the carriage 7 is brought back to a computing zone by a partial return movement, the pick-up dog 71 corresponding to the computing zone will engage under a cam 107 having an active range corresponding to the number of digit columns of a computing zone and the number of computing wheels of the cross-totalizer 34. The cam 107 is turned up at the end, so that the pick-up dogs 71 set for a computing zone will raise the cam 107, and thereby raise a lever 108 pivoted at 109 and guided at 110 from the Fig. 4 to the Fig. 6 position. The cam 107 is secured to the lever 108 by means of a bracket 111. The raising of the lever 108 will cause the rocking of a bell-crank 112, pivoted on the lever 108, by bringing one arm 113 thereof into engagement with a fixed pin 114. The other arm of the bell-crank 112 engages the pin 103 provided on the link rod 92. This will advance the rod 92 and the hook 91 against the tension of the spring 99 a distance sufficient to bring the blocking lug 106 into the path of the locking arm 67, and thus prevent an operation of any of the numeral keys of the typewriter. The locking of the numeral keys is caused by the bail 55 being prevented from rocking and in turn obstructing the movement of the cam lugs 54.

The numeral keys cannot be operated under such circumstances until the cross-totalizer 34 has been re-registered and reconnected to the typewriter carriage 7. To give the cross-totalizer 34 an idle vibratory movement for this purpose, the regular back-space mechanism of the typewriter is made use of. This back-space mechanism is explained in a patent to Helmond 930,962. This mechanism employs a back-space key 115, which when depressed rocks a key lever 116 secured to a rock shaft 117. The rock shaft 117 depresses an arm 118 to draw down on a link 119, so as to operate the back-space pawl 120, which is secured to a rocker 121. This pawl has a double connection with the link 119, by means of a spring 122, and a pivot 123. The action is such that the pawl 120 is first brought into mesh with the typewriter rack 9 by first being rocked about a pivot 121ᵃ and then being rocked about a pivot 124, so as to move the typewriter carriage 7 in a return direction one letter-space. This mechanism is more fully described in the above-mentioned patent to Helmond.

The back-space key 115 is connected to the cross-totalizer 34 by means of a linkage 125, which rocks a bell-crank 126, so as to thrust laterally a link 127, which rocks a lever 128. The lever 128 has pivotally connected thereto a link 129 having a pin-and-slot connection 130 with the carriage 69 of the cross-totalizer 34. The slot of this pin-and-slot connection 130 is of sufficient length to permit a full traveling movement of the cross-totalizer 34 from the typewriter carriage when the back-space key 115 is in its raised inactive position. When the back-space key is depressed with the cross-totalizer 34 in its initial or starting position, the connecting linkage will advance the cross-totalizer 34 its full stroke, thus advancing the rod 92 and the hook 91. Under such circumstances, if a pick-up dog 71 is within the range of a computing zone, as in Figs. 6 and 7, the hook 91 will be depressed against the tension of the spring 102 and pass beyond this pick-up dog; then when the back-space key 115 is permitted to return, the spring 99 will return the cross-totalizer 34 and its carriage until the hook 91 catches onto the said pick-up dog 71 in the range of the computing zone. This will reconnect the cross-totalizer 34 to the typewriter carriage 7, so that the numbers as typewritten will be run up into the computing wheels of the cross-totalizer in their proper denominations. The movement of the cross-totalizer 34 withdraws the blocking lug 106 from its obstructing position with respect to the locking lever 66, so that the numeral keys can now be operated to print and compute.

It should be understood that under ordinary conditions, when the carriage has just left a computing zone, the back-space key 115 is used to re-position the typewriter carriage in a computing zone, and that when the typewriter carriage is so being positioned, the cross-totalizer is also re-positioned, by means of the back-space key, to register with the totalizer on the typewriter carriage. It should further be understood that if the typewriter carriage is re-positioned to a computing zone without the aid of the back-space key 115, this movement will be effective to lock the numeral keys. If the operator now attempts to write with the numeral keys, he finds them locked, thus bringing to his attention the necessity of actuating the back-space key, which movement is effective to re-position the cross-totalizer to bring it to register denominationally with the totalizer on the typewriter carriage by causing the hook 91 to reëngage with one of the dogs 71.

Figure 1:
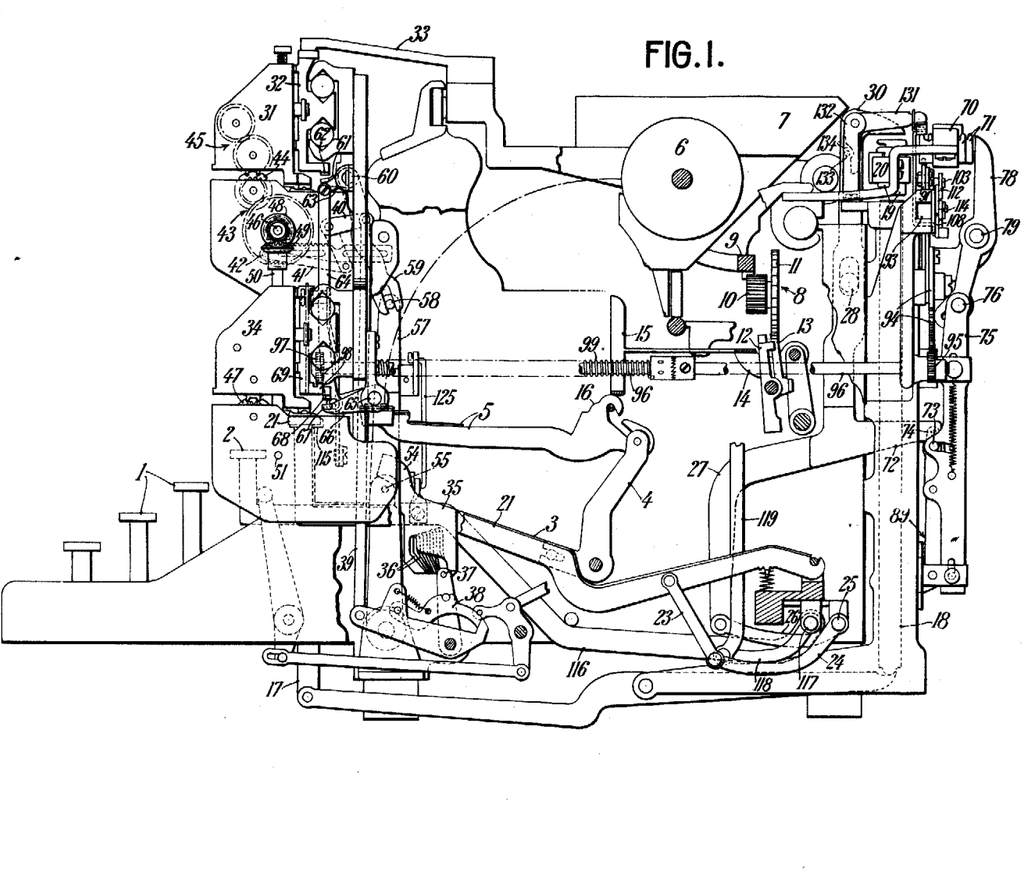
Figure 1 is a side view in elevation, with parts omitted and broken away to show the underlying structure.
Figure 2:
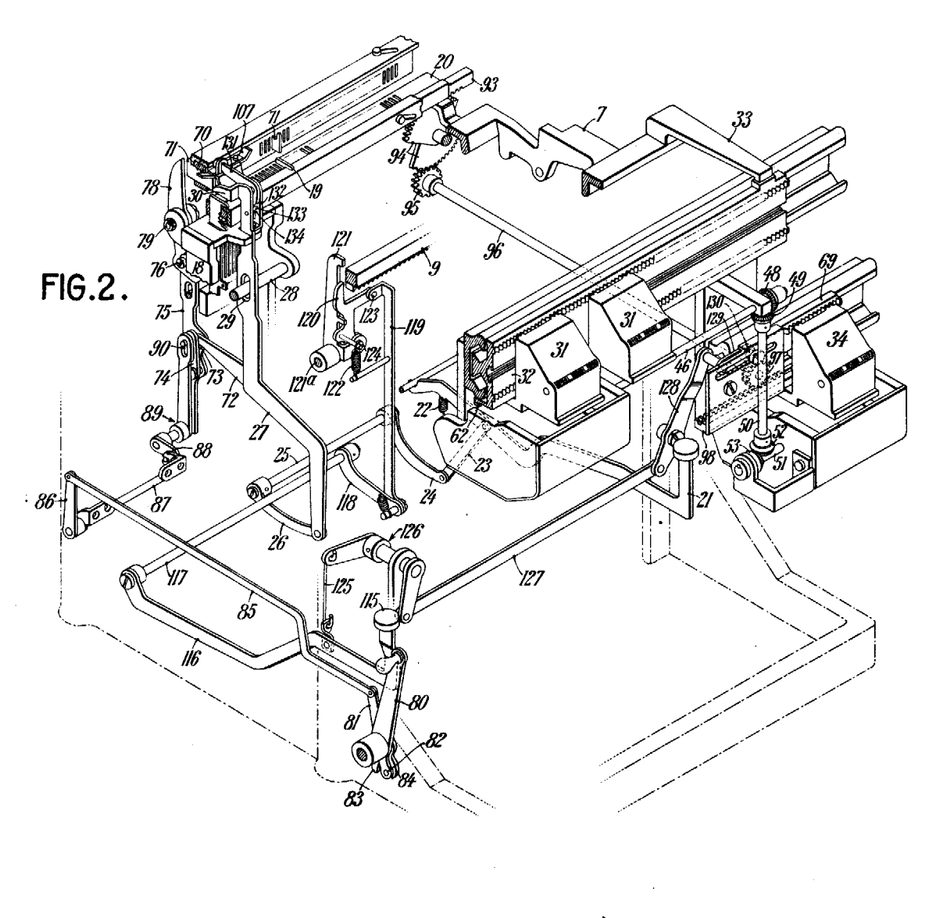
Fig. 2 is a fragmentary, skeleton, perspective view, showing the connections from the back-space key for giving the cross-totalizer a re-registering vibratory movement. This view also shows the means for clearing the numeral-key-locking mechanism from the pick-up dogs when the latter are being set.

To clear the cam 107, or, in other words, to raise it out of the path of the pick-up dogs 71, when setting the latter, there is provided a shifter 131 pivoted to a bracket 132, located alongside of the tabulating stop-setting link 27, Figs. 1 and 2. This link 27 is provided with a pin 133 normally engaging in a notch 134, Fig. 8, provided on one arm of the shifter 131. When the link 27 is depressed to set a tabulating stop, which is also coincident with the setting of a pick-up dog 71 whenever one of the latter is set, the pin 133 rocks the shifter 131 so as to raise the cam 107 clear of the pick-up dogs 71, so that by a continued movement of the link 27, the selected dog 71 may be set. After the setting operation of the pick-up dog and tabulating stop has been completed, the upward movement of the link 27 will permit a return of the cam 107, so that it can be subsequently operated by any one of the set pick-up dogs 71 to bring in play the numeral-key-locking mechanism. This arrangement does not interfere with the operation of the cam 107 for the purpose of locking the numeral keys as the shifter 131 rocks idly with respect to the pin 133.

Considering the operation of the device for a predetermined character of work, the tabulating stops 19 and the pick-up dogs 71 are set by the key 21 to correspond with the particular typewriting and computing zones to be determined by the position of the typewriter carriage, in which it is desired to compute in the cross-totalizer 34 in synchronism with the typewriting. The vertical column totalizers 31 are adjusted to correspond with the typewriting zones in which it is desired to add up the columns vertically. The pick-up dogs 71 need not be set in every instance where there is one of the tabulating stops 19 set, but only in the case of such columns where it is desired to cross-add. The clearance of the cam 107 to permit the setting of the pick-up dogs 71 is provided for by shifting it from the stop-setting mechanism.

For a normal, combined typewriting and computing operation, the carriage advances from zone to zone and step by step in each zone, so as to typewrite and compute, adding up the vertical columns of numbers in such of the totalizers 31 as are set for computing in the different major columns or zones. The cross-totalizer 34 will be picked up automatically by the dogs 71 in such zones as it is desired to compute therein, and will be carried along step by step with the typewriter carriage and dropped to return to its starting position at the end of its capacity and at the end of the computing zone.

In case the typewriter carriage is returned partially, after having advanced beyond a computing zone, so as to reënter this computing zone without passing clear through it, in which zone the cross-totalizer 34 should be connected to the typewriter carriage 7 by a previously-set pick-up dog 71, then this dog will cause a locking of the numeral keys, so as to insure a reconnection of the cross-totalizer 34 in synchronism with the typewriter carriage 7. This is accomplished by a pick-up dog 71 corresponding to the zone raising the cam 107 so as to advance the cross-totalizer 34 slightly beyond its supporting point to bring the blocking lug 106 into an obstructing position with respect to the locking arm 67. This locking arm 67 is operated from the numeral keys, and when it cannot operate itself it acts back on the numeral keys to prevent their operation. This warns the operative that the carriage has been returned to a computing zone in which the cross-totalizer 34 should be reconnected to the typewriter carriage 7 and is not. The same general effect is obtained if the cross-totalizer 34 is disconnected, accidentally or otherwise, while the carriage is in a computing zone. If rod 92 is disconnected from dog 71 when the parts are positioned as shown in Fig. 7, bell-crank 112 will act as a stop for pin 103, and consequently the cross-totalizer will be stopped in the position in which it is effective to lock the numeral keys. Thus, a false operation of the numeral key, which would tend to print numbers intended to be computed without computing them in the cross-totalizer, is prevented.

The cross-totalizer 34 can be reconnected under such circumstances to the carriage 7 by an operation of the back-space key 115. This will shift the carriage 7 in a return direction one letter-space, and at the same time, through a special indicating linkage, give a complete advancing movement to the cross-totalizer 34 and to the traversing mechanism therefor, whereby the hook 91 will be advanced beyond the particular pick-up dog 71 within the range of the cam 107, and thus within the range of the computing zone at the printing point of the machine. At the release of the back-space key the hook 91 will return until it is caught by this pick-up dog 71, thereby bringing the cross-totalizer 34 in synchronism with the typewriter carriage 7 and reconnected for travel with the typewriter carriage 7 for any movement of the typewriter carriage 7 in this computing zone. This will enable the running up of the digits as typewritten into the cross-totalizer 34, preventing any typewriting without computing.

Variations may be resorted to within the scope of the invention, and portions of the improvements may be used without others.

Having thus described my invention, I claim:

1. The combination with a typewriter carriage, of a computing unit comprising two primary elements including registering mechanism and driving means therefor, said primary elements having a relative traveling movement, a computing carriage detachably connected to said typewriter carriage to effect such relative movement, numeral keys, mechanism operated by said numeral keys for effecting a combined typewriting and computing operation, and locking means for said numeral keys brought in play when said typewriter carriage is in a computing zone and said computing carriage is disconnected from said typewriter carriage, whereby a typewriting operation by said numeral keys is prevented in a computing zone when said computing unit is silenced.

2. The combination with a typewriter carriage, of type-actions including numeral keys coöperating with said carriage to print, a computing unit comprising two primary elements having a relative traveling movement, detachable connections between one of said primary elements and said typewriter carriage for effecting such relative movement, locking means for said numeral keys to prevent operation thereof to typewrite in a computing zone after said traveling element has been disconnected from said carriage to prevent a typewriting operation, and means for reconnecting said traveling element to said typewriter carriage acting to unlock said numeral keys.

3. The combination with a typewriter carriage, of type-actions coöperating with said carriage including numeral keys, a computing unit controlled by said numeral keys to effect a combined computing and typewriting operation, said computing unit including two primary elements, one traveling to effect a relative step-by-step movement between said primary elements, connections between said traveling element and said typewriter carriage automatically interrupted on leaving a computing zone as determined by said typewriter carriage, and back-space mechanism for said typewriter carriage arranged to automatically recomplete said connections between said typewriter carriage and said traveling element when returning to a predetermined computing zone for said computing unit.

4. The combination with a typewriter carriage, of a computing unit having two primary elements, one traveling relatively to the other to effect a step-by-step movement, automatically-interrupted connections between said traveling element and said typewriter carriage, enabling a synchronized movement of said traveling element with said typewriter carriage solely for a computing zone, a keyboard including numeral keys for effecting a combined typewriting and computing operation, and means for recompleting the connection automatically interrupted between said traveling element and said typewriter carriage from said keyboard.

5. The combination with a typewriter carriage, of a computing unit, numeral key operated mechanism for effecting combined typewriting and computing operations, automatic connections for intermittently joining said computing unit to said typewriter carriage so as to have a synchronized operation at predetermined points in the travel of said typewriter carriage, and locking means for insuring a reconnection of said computing unit with said typewriter carriage in case said computing unit has been disconnected from said typewriter carriage while passing through a computing zone for said computing unit.

6. The combination with a typewriter carriage, of a computing unit, synchronizing mechanism for causing computing operations of said computing unit to keep step with said typewriter carriage including settable dogs, and parts operated by said dogs when set, the latter parts lying in the path of the setting movement of said dogs, and means for concomitantly setting one of said dogs and clearing said parts to permit the setting of said dog.

7. The combination with a typewriter carriage, of tabulating mechanism for controlling the zonal positions of said carriage including tabulating-setting mechanism, a computing unit, connections for cynchronizing the movements of said computing unit with the movements of said typewriter carriage including pick-up dogs, said connections being automatically interrupted at predetermined intervals in the travel of said typewriter carriage, setting means for said pick-up dogs operated from said tabulating-setting mechanism, means for insuring the reconnection of said computing unit in synchronism with said typewriter carriage after disconnection, parts of said last-mentioned means lying in an obstructing position preventing the setting of said pick-up dogs, and means, rendered effective, concomitantly with the setting of said pick-up dogs by an operation of said tabulating-setting mechanism, for clearing said obstructing parts to a position permitting the setting of said pick-up dogs.

8. The combination with a computing unit comprising two primary elements, of traversing means for one of said primary elements, enabling a relative step-by-step movement between them, for a predetermining computing zone, means for disconnecting said traversing means, means, including numeral keys, for operating said computing unit, and silencing means for said numeral keys operated when said traversing means is disconnected while in said predetermined computing zone.

9. The combination with a computing unit including two primary elements, of traversing means for effecting a relative step-by-step movement between said primary elements according to a prearranged plan of computing zones, means, including numeral keys, for operating said computing unit, a lock for said numeral keys controlled from said computing unit, and means for giving an idle traveling movement to one of said elements of said computing unit, acting to release said lock.

10. The combination with a typewriter carriage, of a computing unit comprising two primary elements, one traveling relatively to the other to effect a step-by-step relative movement, connections enabling the traversing of the traveling element of the computing unit from said typewriter carriage, back-spacing mechanism for said typewriter carriage, and a linkage connected to be operated by said back-spacing mechanism arranged to traverse said traveling element of said computing unit, so as to bring about a readjustment of the relation of said traveling element with respect to said carriage.

10. The combination with a typewriter carriage, of a computing unit having a traveling element connectible to travel with said typewriter carriage, back-spacing mechanism for said typewriter carriage, and connections enabling a traversing movement of said traveling element by said back-spacing mechanism independently of said carriage.

12. The combination with a traveling typewriter carriage, of a computing unit having a traveling element, connections for traversing said element from said typewriter carriage, a key for controlling the position of said typewriter carriage, and connections for traversing said traveling element from said key including a lost-motion connection enabling said traveling element to be traversed by said carriage independently of a movement of said key.

13. The combination with a typewriter carriage, of a computing unit having a traveling element, connections enabling the traversing of said traveling element from said typewriter carriage at predetermined points in the travel of said carriage, said connections including a plurality of pick-up dogs, means, including numeral keys, for controlling the traveling movements of said typewriter carriage and the computing operations of said computing unit, and locking means for said numeral keys operated by said pick-up dogs.

14. The combination with a typewriter carriage, of a computing unit having a traveling element, connections for intermittently traversing said traveling element with said typewriter carriage including a plurality of pick-up dogs settable between active and inactive positions, connections operated by said pick-up dogs when in an active computing zone predetermined upon for said computing unit for insuring a connection of the traveling element of said computing unit with a pick-up dog of said typewriter carriage, said last-mentioned connections including a cam arranged to be directly operated by set ones of said pick-up dogs when in a computing zone, and means for shifting said cam from a source other than said pick-up dogs to permit a setting of said pick-up dogs to an active position.

15. The combination with a typewriter carriage, of a computing unit having a traveling element, connections for traversing said traveling element from said typewriter carriage including a plurality of pick-up dogs adjustable between set and unset positions, a typewriting mechanism for determining zonal positions of said carriage including a series of tabulating stops adjustable between set and unset positions, a link for setting said tabulating stops, a lever for setting said pick-up dogs, connections enabling the concomitant operation of said link and said lever, means, including a cam normally positioned in the path of said pick-up dogs to be actuated thereby, to insure the synchronizing of said traveling element with said typewriter carriage, and a bell crank operated by said link for moving said cam to a position out of the path of one of said pick-up dogs being set by said lever.

16. The combination with typewriting and computing mechanisms having traveling elements to move at times in unison, of means for controlling the typewriting traveling element including a series of tabulating stops, means for controlling the movements of the computing mechanism traveling element including a series of pick-up dogs, means for concomitantly setting a tabulating stop and a pick-up dog both corresponding to the same zone, connections for insuring a synchronized movement of the traveling elements of the typewriting and computing mechanisms including a part operated by one of said dogs, and shifting means operated by said stop-setting mechanism for moving said part to a cleared position, admitting of the setting of the dogs operating the same.

17. The combination with a typewriter carriage, of a computing unit having a traveling element, automatic pick-up connections enabling said traveling element to be intermittently carried by said carriage during a continuous run of said carriage according to a prearranged plan of computing zones, and an auxiliary means for affecting the position of said traveling element when said typewriter carriage is in a predetermined computing zone with said traveling element disconnected from said typewriter carriage.

18. The combination with a traveling typewriter carriage, of a computing unit having a traveling element, automatic pick-up connections between said typewriter carriage and said traveling element, enabling said traveling element to be intermittently traversed from said typewriter carriage according to a prearranged plan, said connections including a series of pick-up dogs and a hook arranged to be individually connected to each of said pick-up dogs when in a computing zone, and means operated by a pick-up dog when in a computing zone for operating said connections to change the position of said traveling element when said hook is disconnected from the pick-up dog in the computing zone.

19. The combination with a typewriter carriage, of a computing unit including a traveling element, connections for traversing said traveling element of said computing unit from said typewriter carriage including a train of gearing, a hook connected to operate said train of gearing, and a series of dogs settable to a position to engage said hook individually and traverse the same when in a computing zone, means for automatically disconnecting said hook from said dogs at the end of a computing zone, and means for enabling a dog when returning into a computing zone, after having advanced the same, to operate said hook so as to give a partial indirect advance movement to said traveling element.

20. The combination with a typewriter carriage, of a computing unit having a traveling element, connections for traversing said traveling element from said typewriter carriage including a train of gearing connected to said traveling element, a hook connected to operate said train of gearing, and a series of pick-up dogs settable to engage and traverse said hook when in a computing zone, automatic means for disconnecting said hook from each of said pick-up dogs as they advance through a computing zone, numeral keys for controlling said carriage and said computing unit, locking means for said traveling element operated by said numeral keys, a blocking lug on said traveling element capable of being brought into the path of movement of said locking means so as to act back on said numeral keys and prevent an operation of the same, and means operated by any of said pick-up dogs when returning into a computing zone, after having been disconnected from said hook, to give a partial actuation of said connections between said typewriter carriage and said traveling element, so as to bring said blocking lug into the path of the locking means to said numeral keys.

21. The combination with a traveling carriage, of a computing unit having a traveling element, one or more pick-up dogs on said carriage, a hook connected to said traveling element arranged to be engaged and traversed by said pick-up dogs during a traveling movement of said carriage, means for disconnecting said hook from said pick-up dogs, means for returning said traveling element to a starting position when said hook is disconnected from said carriage, a set of levers for advancing said hook slightly from its starting position, and a cam connected to operate said levers having a range of a computing zone and positioned to be operated by a dog when in a computing zone, whereby said traveling element may be slightly advanced from said carriage when said carriage has been returned to a computing zone after disconnecting the dog from said pick-up hook.

22. The combination with a typewriter carriage, of a computing unit including a traveling element, connections for intermittently traversing said traveling element from said typewriter carriage including a hook and a plurality of pick-up dogs engaging said hook, means for disconnecting said hook from each of said dogs at the end of a computing zone, and means operated from one of said pick-up dogs as it returns into a computing zone for insuring the reconnection of said hook with the pick-up dog in the computing zone, and thus the reconnection of the traveling element with said typewriter carriage.

23. The combination with a typewriter carriage, of a computer carriage, means to cause said computer carriage to travel with said typewriter carriage while the latter passes through a computing zone, and to release said computer carriage when said typewriter carriage passes out of said computing zone, means to return said computer carriage to a normal position after the typewriter carriage has passed through a computing zone, a key, and means, actuated by said key for re-positioning said computer carriage relatively to said typewriter carriage when the latter is moved back into a computing zone.

24. The combination with a typewriter carriage, of a computer carriage adapted to travel with said typewriter carriage during various intervals, back-spacing means for said typewriter carriage, and means connected to said back-spacing means for re-positioning said computer carriage relatively to said typewriter carriage.

25. The combination with a typewriter carriage having a plurality of footing totalizers arranged to travel therewith through computing zones, of a cross-totalizer adapted to travel with said typewriter carriage when the latter travels through a computing zone, said cross-totalizer being adapted to resume a normal position after the typewriter carriage passes out of the computing zone, a back-spacing mechanism for moving the typewriter carriage to back a footing totalizer into a computing zone, and means operated by said back-spacing mechanism for re-positioning said cross-totalizer to register the latter denominationally with said footing totalizer and with said typewriter carriage.

26. The combination with a typewriter carriage, of a sub-carriage, means to cause said sub-carriage to travel with said typewriter carriage when the latter travels through any one of a plurality of zones, means for returning said sub-carriage to a normal position each time after the typewriter carriage has passed through a zone, a back-spacing mechanism for said typewriter carriage, and means for re-connecting said sub-carriage with said typewriter carriage when the latter carriage is being back-spaced by said back-spacing mechanism.

27. The combination with a typewriter carriage, of a sub-carriage adapted to travel with said typewriter carriage when the latter travels though any one of a plurality of zones, pick-up devices for said sub-carriage, means for releasing said sub-carriage so that it may resume a normal position after the typewriter carriage has passed through a zone, back-spacing mechanism for said typewriter carriage, and means controlled by said back-spacing mechanism for reconnecting said sub-carriage with one of said pick-up devices.

28. The combination with a typewriter carriage, of a sub-carriage, means to cause said sub-carriage to travel with said typewriter carriage during the passage of the latter through various computing zones, printing keys, means to cause said sub-carriage to become released from said typewriter carriage and resume a normal position, means for rendering said keys ineffective when the typewriter carriage is moved backwardly into a computing zone, and means, including a key, for simultaneously reconnecting said sub-carriage with said typewriter carriage and rendering said printing keys effective.

29. The combination with a typewriter carriage, of a sub-carriage adapted to travel with said typewriter carriage through various zones, printing keys, said sub-carriage being adapted to become released from said typewriter carriage and resume a normal position, means for locking said keys when the typewriter carriage is backed into a zone, and key-operated means for reconnecting said sub-carriage with said typewriter carriage and for unlocking said printing keys.

30. The combination with a typewriter carriage, of a sub-carriage adapted to travel with said typewriter carriage when the latter travels through any one of a plurality of zones, pick-up devices for said sub-carriage, means for releasing said sub-carriage so that it may resume a normal position after the typewriter carriage has passed through a zone, printing keys, means controlled from said pick-up devices for locking said keys when the typewriter carriage is backed into a zone, and key-operated means for reconnecting said sub-carriage with one of said pick-up devices and for unlocking said printing keys.

31. The combination with a typewriter carriage, of a sub-carriage, printing keys, said sub-carriage being adapted to travel with said typewriter carriage through various zones, and to become released from said typewriter carriage to resume a normal position, means controlled by the typewriter carriage for rendering said keys ineffective when the typewriter carriage is backed into a zone, and key operated means for simultaneously reconnecting said sub-carriage with said typewriter carriage and rendering said printing keys effective.

32. The combination with a typewriter carriage, of a sub-carriage, printing keys, said sub-carriage being adapted to travel with said typewriter carriage through various zones and to become released from said typewriter carriage to resume a normal position, means effective when said typewriter carriage is backed into a zone to impart a movement to said sub-carriage to render said printing keys ineffective, and means for rendering said keys effective.

33. The combination with a typewriter carriage, of a sub-carriage, printing keys, means to cause said sub-carriage to travel with said typewriter carriage through various zones, and to become released from said typewriter carriage to resume a normal position, settable devices connected to said typewriter carriage to travel therewith, controlling means, actuated by said settable devices, to render said printing keys ineffective when the typewriter carriage is backed into a zone, said controlling means being effective in its operation to impart a movement to said sub-carriage, and means for rendering said keys effective.

34. The combination with a typewriter carriage, of a computer carriage adapted to travel with said typewriter carriage while the latter passes through computing zones, pick-up devices for connecting said typewriter carriage with said computer carriage, means for releasing said computer carriage from said typewriter carriage when the latter passes out of a computing zone, a key, and means actuated by said key for reconnecting said computer carriage with said typewriter carriage when the latter is backed into a computing zone.

35. The combination with a typewriter carriage, of a sub-carriage, pick-up devices connected to travel with said typewriter carriage, connecting means to cause said sub-carriage to move with a pick-up device during the passage of the latter through a computing zone, means to render said connecting means ineffective when the effective pick-up device passes out of a computing zone, back-spacing mechanism for said typewriter carriage, and means controlled by said back-spacing mechanism to reconnect said sub-carriage with one of said pick-up devices by means of said connecting means.

36. The combination with a typewriter carriage, of a sub-carriage, connections whereby said sub-carriage is caused to travel with said typewriter carriage through various zones, means to release said sub-carriage by rendering said connections ineffective, means to restore said sub-carriage to normal position when released, numeral keys, a numeral-key lock, means to render said lock effective when said typewriter carriage is backed into a zone, and means including a key for reconnecting said sub-carriage with said typewriter carriage and rendering said lock ineffective.

37. The combination with a traveling carriage, of a computer carriage, mechanism whereby said computer carriage is connected with said traveling carriage to travel therewith through a computing zone, released at the end of a computing zone, and restored to normal position, numeral keys, a numeral-key lock ineffective when said computer carriage is in normal position, and means to render said lock effective in case said computer carriage becomes disconnected from said traveling carriage during the travel of the latter through a computing zone.

38. The combination with a traveling carriage, of a computer carriage, connections whereby said computer carriage is caused to travel with said traveling carriage during the passage of the latter through computing zones, means to release said computer carriage, means to restore said computer carriage to normal position, numeral keys, a numeral-key lock rendered effective by said computer carriage when held in a certain abnormal position, and means to cause said computer carriage to assume said abnormal position when the typewriter carriage is backed into a computing zone.

39. The combination with a traveling carriage, of computing means, including a computer carriage and numeral keys, means actuated by said traveling carriage to advance the computer carriage therewith through a computing zone and release the same, means to return said computer carriage to its normal position, a numeral-key lock rendered effective by said computer carriage when in a certain abnormal position, and means whereby said computer carriage, if disconnected during a passage through a computing zone, will be caused to assume said abnormal position when returned by said returning means.

40. The combination with a carriage, of a column-computer unit comprising two elements, namely, a master wheel and a totalizer, one of said elements traveling relatively to the other when said carriage passes through a computing zone, a cross-computer unit comprising two elements, namely, a master wheel and a totalizer, one of said last-mentioned elements being adapted to travel relatively to the other, means to cause the traveling element of said cross-computer unit to travel with the traveling element of the column-computer unit when the carriage passes through a computing zone, means to permit said cross-computer traveling element to return to a normal position after the carriage passes out of a computing zone, a key, and means controlled thereby for returning said carriage to said computing zone and for registering said traveling elements of each computing unit with respect to the relatively-fixed elements.

41. The combination with a carriage, of a column-computer unit comprising two elements, namely, a master wheel and a totalizer, one of said elements traveling relatively to the other when said carriage passes through a computing zone, a cross-computer unit comprising two elements, namely, a master wheel and a totalizer, one of said last-mentioned elements being adapted to travel relatively to the other, means to cause the traveling element of said cross-computer unit to travel with the traveling element of the column-computer unit when the carriage passes through a computing zone, means to permit said cross-computer traveling element to return to a normal position after the carriage passes out of the computing zone, a back-spacer for the traveling element of said column-computer unit, and a connection from said back-spacer for causing a relative re-registering of the elements of said cross-computer unit.

42. The combination with a carriage, of a column-computer unit comprising two elements, namely, a master wheel and a totalizer, one of said elements traveling relatively to the other when said carriage passes through a computing zone, a cross-computer unit comprising two elements, namely, a master wheel and a totalizer, one of said last-mentioned elements being adapted to travel relatively to the other, means to cause the traveling element of said cross-computer unit to travel in synchronism with the traveling element of the column-computer unit when the carriage passes through a computing zone, means to permit said cross-computer traveling element to return to a normal position after the carriage passes out of the computing zone, and a back-spacer effective to back-space both of said traveling elements when the carriage is in the computing zone, said back-spacer being effective, after the carriage passes out of the computing zone, to reposition the traveling element of the cross-computer unit relatively to the fixed element thereof.

43. The combination with a typewriter carriage, of a cross-totalizer adapted to travel with said typewriter carriage when the latter passes through a computing zone, a master wheel therefor, means to permit said cross-totalizer to resume a normal position when the typewriter carriage passes out of the computing zone, and key-operated means for repositioning said cross-totalizer relatively to its master wheel after said totalizer has returned to its normal position.

44. The combination with a typewriter carriage and a plurality of column-totalizers traveling therewith, of a master wheel therefor, a cross-totalizer adapted to travel with said typewriter carriage when the latter passes through a computing zone, means to permit said cross-totalizer to resume a normal position when the typewriter carriage passes out of a computing zone, and key-operated means for simultaneously back-spacing the typewriter carriage to reposition one of the column-totalizers relatively to the master wheel, and for repositioning said cross-totalizer relatively to its master wheel after the typewriter carriage has passed out of the computing zone.

45. The combination with a typewriter carriage and a plurality of adjustable elements traveling therewith, of a cross-totalizer, means including a pick-up element to cause said totalizer to travel intermittently with said carriage, a back-spacer for said typewriter carriage, a connection from said back-spacer to reposition said cross-totalizer, numeral keys, locking means for said numeral keys, means including an intermediate lever for rendering said locking means effective, a swinging lever, and a shoe on said swinging lever, said intermediate lever being pivotally supported on said swinging lever, said adjustable elements being effective during the movement of the carriage in the reverse letter-feed direction to actuate said pivoted lever to render said locking means effective, said pivoted lever, during its actuation, serving as a lever of the third order.

46. The combination with a typewriter carriage, of a plurality of adjustable elements traveling therewith, a cross-totalizer, means for causing said cross-totalizer to travel intermittently with said typewriter carriage, key-operated means for back-spacing said typewriter carriage and for repositioning said cross-totalizer relatively to said typewriter carriage, numeral keys, and means for locking said numeral keys when the carriage is backed into a compting zone, without the assistance of the key-operated means, said locking means comprising an intermediate element actuable by said adjustable elements.

47. The combination with a typewriter carriage, of a plurality of adjustable elements traveling therewith, a cross-totalizer, means for causing said cross-totalizer to travel intermittently with said typewriter carriage, key-operated means for back-spacing said typewriter carriage and for repositioning said cross-totalizer relatively to said typewriter carriage, numeral keys, and means for locking said numeral keys when the carriage is backed into a computing zone, without the assistance of the key-operated means, said locking means comprising a swinging lever, actuable by said adjustable elements, and a pivoted element carried by said swinging lever.

48. The combination with a typewriter carriage and a plurality of adjustable elements traveling therewith, of a cross-totalizer, means including a pick-up element to cause said totalizer to travel intermittently with said carriage, a back-spacer for said typewriter carriage, a connection from said back-spacer to reposition said cross-totalizer, numeral keys, locking means for said numeral keys, and means including an intermediate element for rendering said locking means effective, said intermediate element being actuable by any one of said traveling elements when the typewriter carriage is moved in a reverse letter-feed direction.

HENRY L. PITMAN.

Witnesses:
A. J. ROURBIER,
J. J. KENNEDY.